(12) United States Patent
Vauchel

(10) Patent No.: US 8,240,982 B2
(45) Date of Patent: Aug. 14, 2012

(54) STRUCTURE FOR AN AIR INLET LIP OF AN ELECTRIC DE-ICING POD COMPRISING AN ACOUSTIC ATTENUATION ZONE

(75) Inventor: Guy Bernard Vauchel, Le Havre (FR)

(73) Assignee: Aircelle, Gonfreville l'Orcher (FR)

( * ) Notice: Subject to any disclaimer, the term of this patent is extended or adjusted under 35 U.S.C. 154(b) by 994 days.

(21) Appl. No.: 12/161,194

(22) PCT Filed: Mar. 8, 2007

(86) PCT No.: PCT/FR2007/000413
§ 371 (c)(1),
(2), (4) Date: Jul. 17, 2008

(87) PCT Pub. No.: WO2007/110494
PCT Pub. Date: Oct. 4, 2007

(65) Prior Publication Data
US 2011/0120076 A1 May 26, 2011

(30) Foreign Application Priority Data

Mar. 24, 2006 (FR) ...................................... 06 02547

(51) Int. Cl.
*F01D 25/02* (2006.01)
(52) U.S. Cl. ...................................................... 415/119
(58) Field of Classification Search .................. 415/199, 415/220, 119; 60/725, 39.093; 219/529, 219/520; 244/1 N, 134 R, 134 D
See application file for complete search history.

(56) References Cited

U.S. PATENT DOCUMENTS

| | | | | |
|---|---|---|---|---|
| 5,475,204 A | * | 12/1995 | Giamati et al. | 219/548 |
| 5,925,275 A | * | 7/1999 | Lawson et al. | 219/543 |
| 5,934,617 A | * | 8/1999 | Rutherford | 244/134 E |
| 5,947,418 A | * | 9/1999 | Bessiere et al. | 244/134 D |
| 5,971,323 A | * | 10/1999 | Rauch et al. | 244/134 D |
| 7,923,668 B2 | * | 4/2011 | Layland et al. | 219/535 |
| 2004/0065092 A1 | * | 4/2004 | Wadia et al. | 60/778 |
| 2005/0006529 A1 | * | 1/2005 | Moe et al. | 244/134 D |
| 2005/0189345 A1 | * | 9/2005 | Brunner et al. | 219/548 |
| 2007/0210073 A1 | * | 9/2007 | Hubert et al. | 219/535 |

(Continued)

FOREIGN PATENT DOCUMENTS

EP 1495963 A2 1/2005

(Continued)

*Primary Examiner* — Christopher Verdier
*Assistant Examiner* — Christopher R Legendre
(74) *Attorney, Agent, or Firm* — Porzio, Bromberg & Newman, P.C.

(57) ABSTRACT

The present invention relates to a structure (7) for a lip (4a) of an air inlet (4) of a turbojet pod (1) including an outer skin (12), designed to be oriented towards the outside of the lip, and an inner skin (13), designed to be oriented towards the inside of the lip, characterized in that it includes at least one electric heating element (14) situated between the inner skin and the outer skin and capable of being connected to an electric supply (15, 16), and the at least one electric heating element extending at least partly through an acoustic attenuation zone having perforations (11) passing through the structure and associated with an acoustic attenuation structure (30) fitted to the inner skin.

10 Claims, 4 Drawing Sheets

U.S. PATENT DOCUMENTS

| | | | |
|---|---|---|---|
| 2008/0179448 A1* | 7/2008 | Layland et al. | 244/1 N |
| 2009/0134272 A1* | 5/2009 | Vauchel | 244/54 |
| 2010/0199629 A1* | 8/2010 | Chene et al. | 60/39.093 |
| 2011/0005188 A1* | 1/2011 | Roger | 60/39.093 |
| 2011/0162340 A1* | 7/2011 | Valleroy et al. | 60/39.093 |

FOREIGN PATENT DOCUMENTS

| | | |
|---|---|---|
| GB | 885131 | 12/1961 |
| GB | 1011436 | 12/1965 |
| GB | 1117843 | 6/1968 |
| WO | 2005087589 A1 | 9/2005 |

* cited by examiner

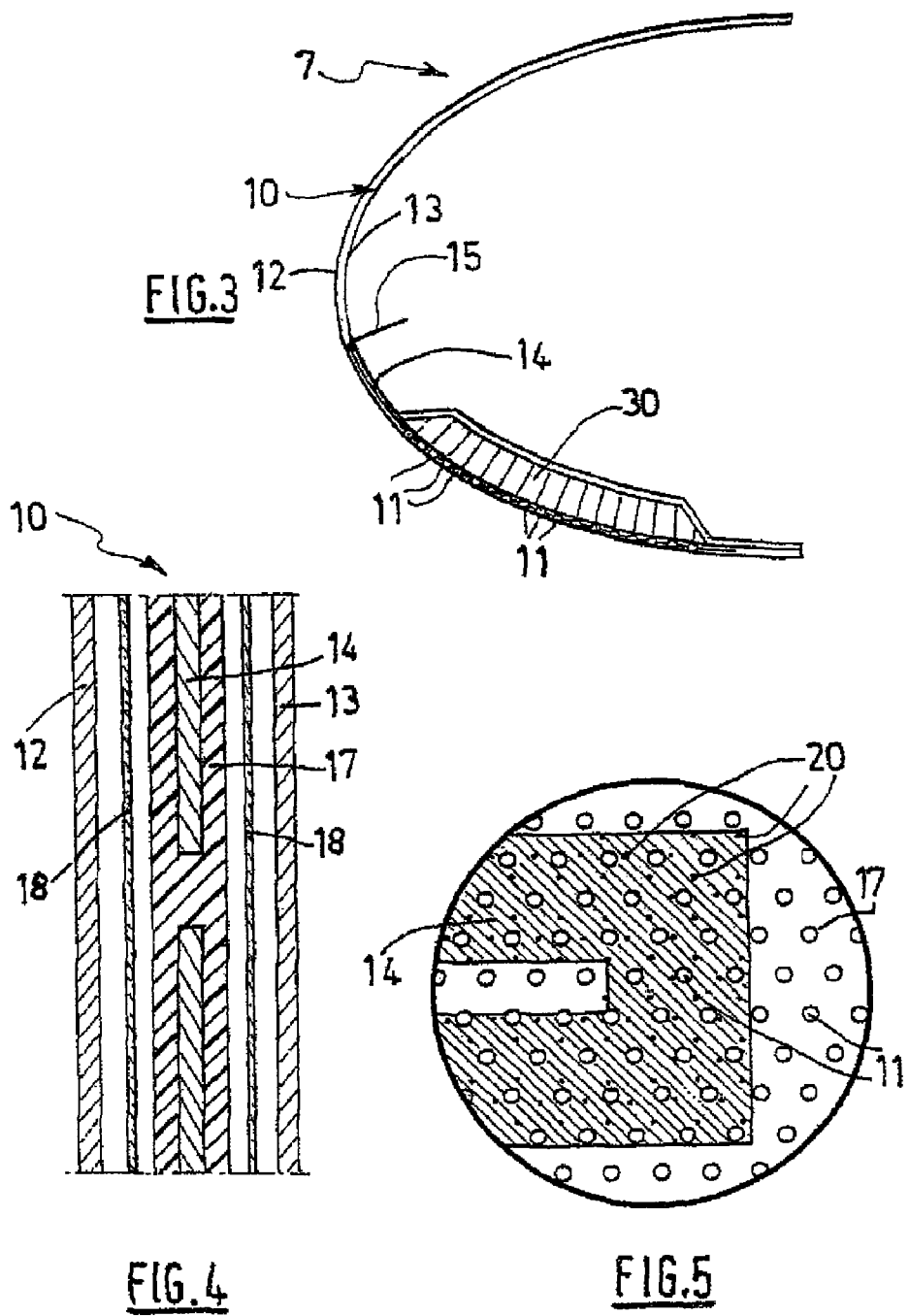

STRUCTURE FOR AN AIR INLET LIP OF AN ELECTRIC DE-ICING POD COMPRISING AN ACOUSTIC ATTENUATION ZONE

The present invention relates to a structure for a lip of an air intake of a turbojet pod comprising an outer skin, designed to be oriented toward the outside of the lip, and an inner skin, designed to be oriented toward the inside of the lip.

An aircraft is propelled by one or more propulsion assemblies comprising a turbojet housed in a tubular pod. Each propulsion assembly is attached to the aircraft by a pylon usually situated beneath a wing or on the fuselage.

A pod usually has a structure comprising an air intake upstream of the motor, a mid-section designed to surround a fan of the turbojet, a downstream section housing thrust reversal means and designed to surround the combustion chamber of the turbojet, and is usually terminated by an exhaust nozzle whose outlet is situated downstream of the turbojet.

The air intake comprises, on the one hand, an intake lip suitable for allowing the optimal capture toward the turbojet of the air necessary to supply the fan and the internal compressors of the turbojet, and, on the other hand, a downstream structure to which the lip is fitted and which is designed to appropriately channel the air toward the fan blades. The assembly is attached upstream of a casing of the fan belonging to the upstream section of the pod.

In flight, depending on the temperature and humidity conditions, ice may form on the pod at the air intake lip. The presence of ice or rime changes the aerodynamic properties of the air intake and disrupts the flow of the air to the fan. In addition, pieces of ice may sometimes detach from the air intake lip and collide with components of the turbojet such as the fan blades.

It is therefore necessary to seek solutions making it possible to prevent the formation of ice on the air intake lip.

A first solution consists in tapping off warm air at the turbojet compressor and in bringing it to the air intake lip whose walls it heats. However, such a device requires a system of warm air supply ducts between the turbojet and the air intake, and a system for discharging the warm air at the air intake lip. This increases the weight of the propulsion assembly which is undesirable.

A second solution, described in patent EP 1 495 963 consists in applying a heating resistance to an outer wall of the air intake lip. This technology makes it necessary to add anti-erosion protection over the de-icing heating resistance.

Such a solution has several disadvantages. First of all, the anti-erosion product is not appropriate to the surface quality demanded for the outer wall of the lip. Then, in the event of partial covering of the air intake lip, the latter has a discontinuity which is harmful to the aerodynamic line of the air intake. Finally, such a system helps to increase the total thickness of the lip, which may harm the acoustic attenuation performance, the latter being closely associated with the thickness of the air intake lip.

However, such a system makes it possible to make weight savings relative to a system using warm air tapped off from the turbojet.

To remedy these disadvantages, a solution known and described by document WO 2005/087589 proposes a structure for an air intake lip of a turbojet pod comprising an outer skin, designed to be oriented toward the outside of the lip, and an inner skin, designed to be oriented toward the inside of the lip, characterized in that it comprises at least one electric heating element capable of being connected to electric supply means, said electric heating element being situated between the inner skin and the outer skin.

However, such a solution does not take account of the possible presence on the air intake structure of an acoustic attenuation zone associated with an acoustic attenuation structure.

The object of the present invention is to remedy the above disadvantage and to do so consists in a structure for a lip off an air intake of a pod of a turbojet comprising an outer skin, designed to be oriented toward the outside of the lip, and an inner skin, designed to be oriented toward the inside of the lip, characterized in that it comprises at least one electric heating element situated between the inner skin and the outer skin and capable of being connected to electric supply means, at least one electric heating element extending at least partly across an acoustic attenuation zone having perforations passing through the structure and associated with an acoustic attenuation structure fitted to the inner skin.

Therefore, by providing a drillhole through the whole thickness of the air intake structure comprising the de-icing system, the acoustic attenuation zone has a uniform drillhole appropriate to the associated acoustic attenuation structure. Specifically, unlike the prior art in which a perforated electric heating element can be used (grill, heating cloth) and in which these specific perforations of the electric heating element are not in line either with the sound frequencies to be absorbed or with the corresponding acoustic attenuation structure; the electric heating element is in this instance perforated with the air intake structure, which makes it possible to obtain an appropriate uniform drillhole over the whole thickness of the acoustic attenuation zone.

It will be noted that in this case of an air intake lip fitted with an internal acoustic attenuation structure, the wall of the air intake lip has, at the acoustic attenuation structure, a multitude of acoustic perforations. Thanks to the invention, the edges of the acoustic holes are made in the outer rigid skin and traverse the wall instead of being made, as in the prior art, in the electric heating element before traversing the wall. In this manner, a good quality of acoustic edge is retained while the presence of an external electric heating element, usually not very hard, would lead to an acoustic edge of mediocre quality.

In addition to this enhancement to the level of acoustic performance, it should be noted that the proposed solution also makes it possible to retain the advantages of an air intake structure incorporating an electric heating element in the very structure of the air intake lip of the pod according to which it is not necessary to apply a layer of additional protection and the outer skin of the structure still defines the aerodynamic properties of the air intake. Consequently, it is possible for the air intake lip to be fitted only partially with one or more electric heating elements without creating discontinuity on the outer surface of the air intake lip.

Advantageously, the structure comprises at least one layer of protection encompassing the electric heating element.

Preferably, at least one layer of protection is a layer of a resin.

In an alternative or additional manner, at least one layer of protection is a ply of glass.

As a variant, the structure comprises at least two layers of at least one electric heating element, if necessary separated by at least one metal or organic layer.

Advantageously, the structure comprises a reflective strip placed after the electric heating element and before the inner skin. The presence of this strip makes it possible to reduce the heat losses on the side of the inner skin and to concentrate the de-icing function toward the outer skin. This makes it possible to optimize the consumption of electricity.

Preferably, the outer skin has a thickness of less than 1 mm. This makes it possible to optimize the transmission of heat through the outer skin.

Advantageously, the electric heating element is in the form of a metal band forming a heating resistance.

As a variant, the electric heating element is in the form of a cloth, particularly organic or metallic, forming a heating resistance.

Preferably, the electric heating element is in the form of a coil.

The present invention also relates to a lip of an air intake for a pod of a turbojet made from one or more structures as described above.

The present invention also relates to a pod of a turbojet comprising an air intake, characterized in that the air intake is fitted with a lip according to the invention.

The embodiment of the invention will be better understood with the aid of the detailed description that is set out below with reference to the appended drawing in which:

FIG. 3 is a representation in cross section of a structure according to the invention.

FIG. 4 is an enlarged view in section of the structure according to the invention.

FIG. 5 is a partial view of the heating element on the acoustic attenuation structure.

Figure 1:
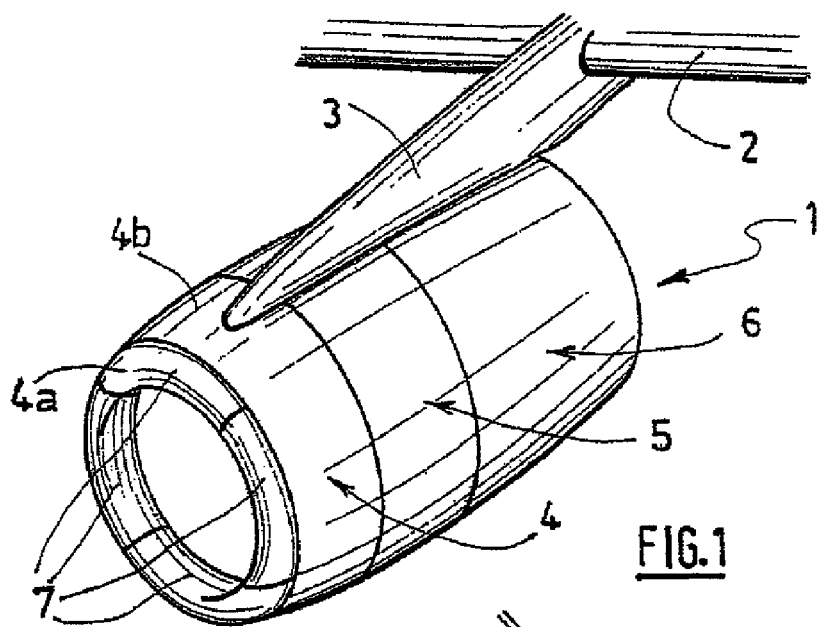
FIG. 1 is a schematic representation in perspective of a pod.
Figure 2:
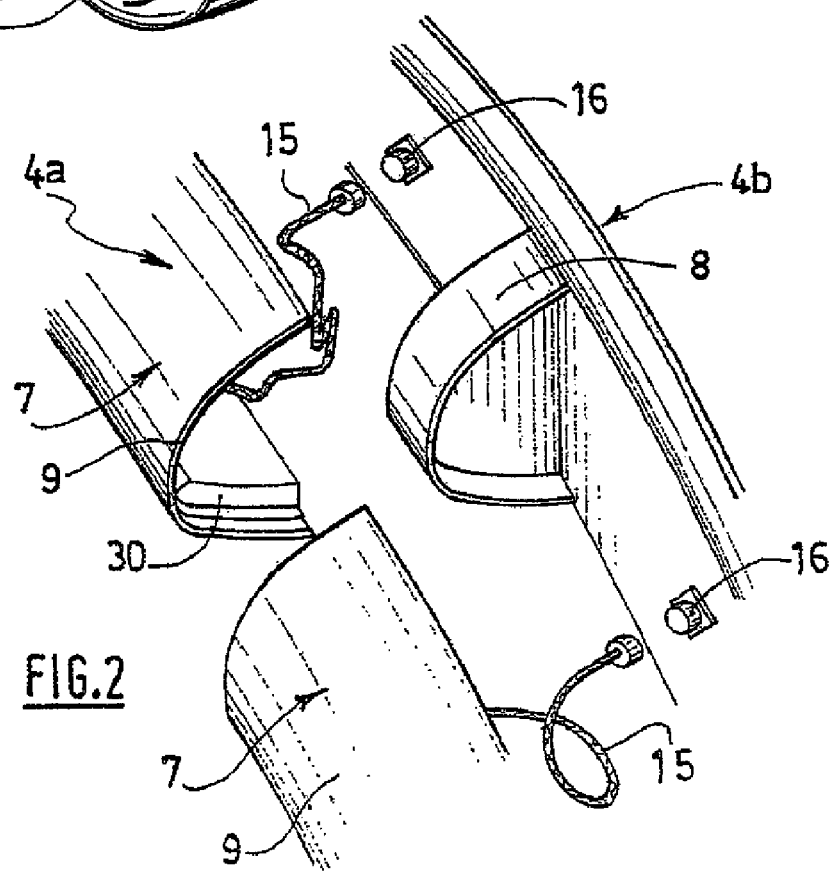
FIG. 2 is an enlarged partial representation of an air intake lip produced from structures according to the invention.

A pod 1 according to the invention as represented in FIG. 1 constitutes a tubular housing for a turbojet (not visible) for which it is used to channel the air flows that it generates. The pod 1 is situated beneath a wing 2 to which it is attached by a pylon 3. It also houses various components necessary to the operation of the turbojet.

More precisely, the pod 1 has a structure comprising a front section forming an air intake 4, a mid-section 5 surrounding a fan (not visible) of the turbojet, and a rear section 6 surrounding the turbojet and housing a thrust reverser system (not visible).

The air intake 4 is divided into two parts, namely, on the one hand, an intake lip 4a suitable for allowing the optimal capture to the turbojet of the air necessary to supply the fan and the internal compressors of the turbojet and, on the other hand, a downstream structure 4b to which the lip 4a is fitted and which is designed to appropriately channel the air toward the blades of the fan. The assembly is attached upstream of a fan casing belonging to the mid-section 5 of the pod.

The air intake lip 4a is produced with the aid of structures 7 according to the invention fitted to the downstream structure 4b over the whole periphery of the pod 1. Each structure 7 is separated from the adjacent structure by a separation element 8 fixedly attached to the downstream structure 4b.

The air intake lip 4a is in this instance made from four structures 7. It could quite evidently be made with the aid of two structures 7, in a single piece or else from more than four structures 7.

Each structure 7 comprises a wall 9 formed so as to give the lip 4a the desired profile and an inner acoustic attenuation structure 30, of the honeycomb type, the latter being situated in contact with a zone of the wall 10 opening onto the entrance of the fan and provided with a multitude of regularly spaced perforations 11.

The wall 10 of the structure 7 comprises an outer skin 12 designed to be oriented toward the inside of the lip, an inner skin 13 designed to be oriented toward the inside of the lip and an electric heating element 14 situated between the inner skin 13 and the outer skin 12. The electric heating element 14 is connected to an electric supply outlet itself connected to an electric cable 15 designed to be connected to a supply socket 16 of the downstream structure.

The wall 10 may be fitted only partially with an electric heating element 14, depending on the zones that have to be de-iced. Therefore, as shown in FIG. 3, the wall 10 is fitted with an electric heating element only on the acoustic attenuation structure 30 in the zone of the wall 10 opening onto the entrance of the fan. Attention will be paid to ensure that the electric heating element 14 does not extend up to the attachment between the structure 7 and the downstream structure 4b and remains separate from the means for attachments between the structure 7 and the downstream structure 4b. Specifically, the attachment of the structure 7 to the downstream structure 4b is usually made by means of rivets (not visible) that must not come into contact with the electric heating element 14.

The electric heating element 14 is encompassed in a layer of protection such as a resin 17, itself encased with plies of glass 18 on either side of the electric heating element 14.

The outer skin 12 provides the external aerodynamic line of the lip 4a. It may be metallic or made of composite material, be preformed or made at the same time as the electric heating element 14 is installed. The outer skin 12 has a relatively small thickness so as to ensure a good transmission of the heat to the outside of the lip. For example, this thickness will be a few tenths of a millimeter.

The inner skin 13 covers the electric heating element 14 and finalizes the wall 10. As for the outer skin 12, it may be metallic or made of composite material, be preformed or made at the same time as the electric heating element 14 is installed. It should be noted that the thicknesses of the inner skin 12 and the outer skin 13 may be nonidentical.

In addition, it is possible to associate with the inner skin 12 a reflective strip (not shown) situated between the heating element 14 and the inner skin 13 and designed to reduce the heat loss on the side of the inner skin 13 in order to concentrate the diffusion of heat toward the outer skin 12. This makes it possible to reduce the electricity consumption of the structure 7 in order to obtain the desired de-icing.

The various layers constituting the wall 10 of the structure 7 are connected together by a connecting material, of the adhesive or resin type (not shown).

The electric heating element 14 is of the cut-out metal resistance, organic cloth or resistive metal, or else resistive organic sheet type. A particularly advantageous shape of the electric heating element 14 is a coil shape. Quite evidently, it is appropriate to ensure that the surface of the electric heating element 14 makes it possible to reach the desired de-icing temperature.

Figure 6:
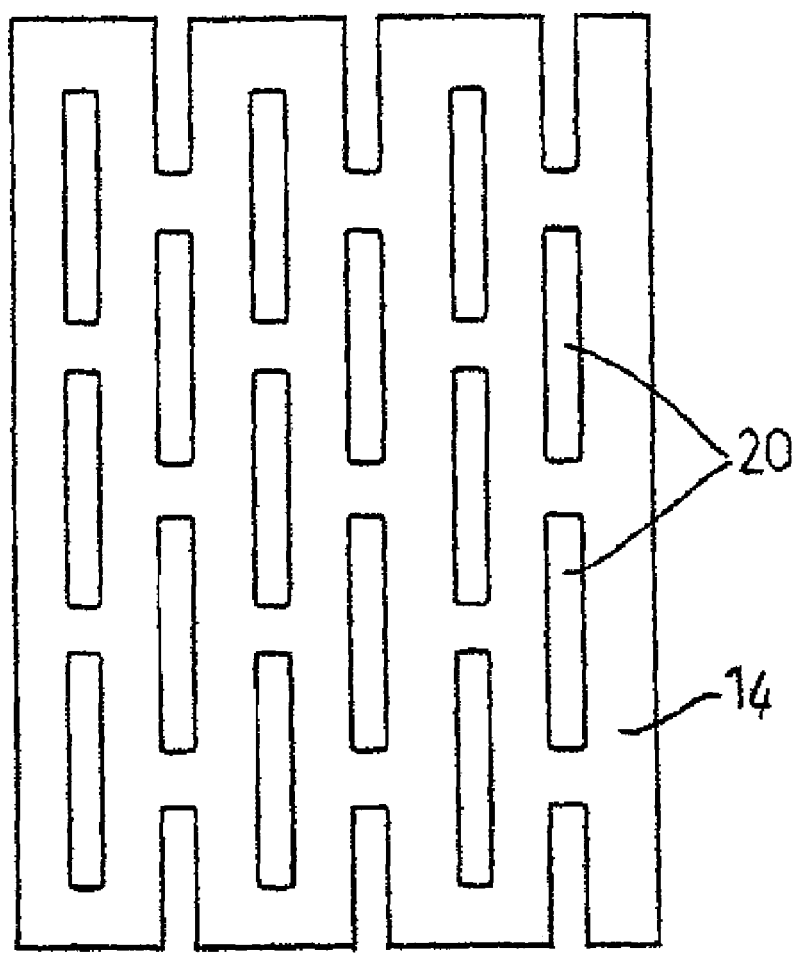
FIG. 6 is a schematic view of a variant of a heating element portion.
Figure 7:
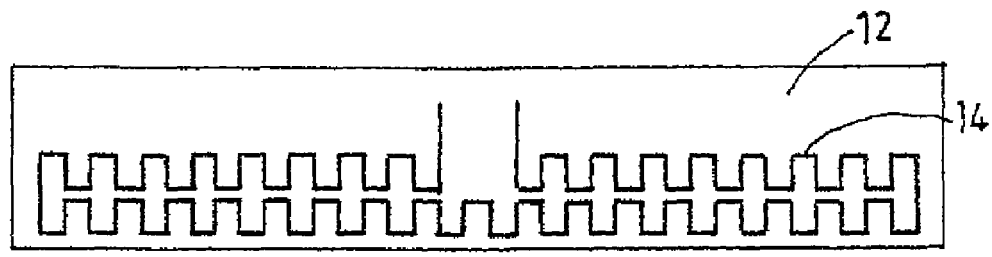
FIGS. 7 to 10 represent various variant embodiments of the electric heating element(s).
Figure 8:
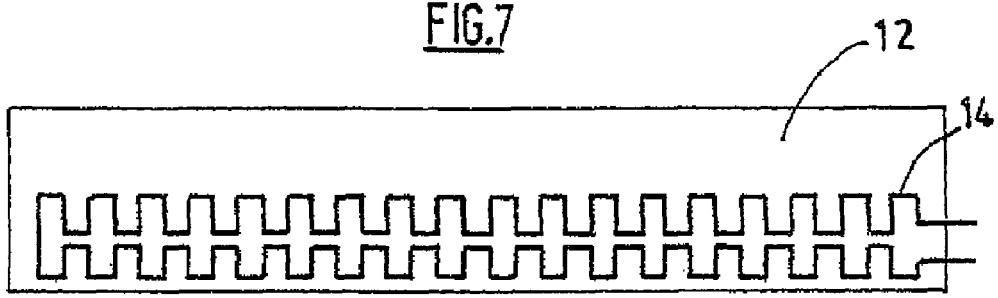
Figure 9:
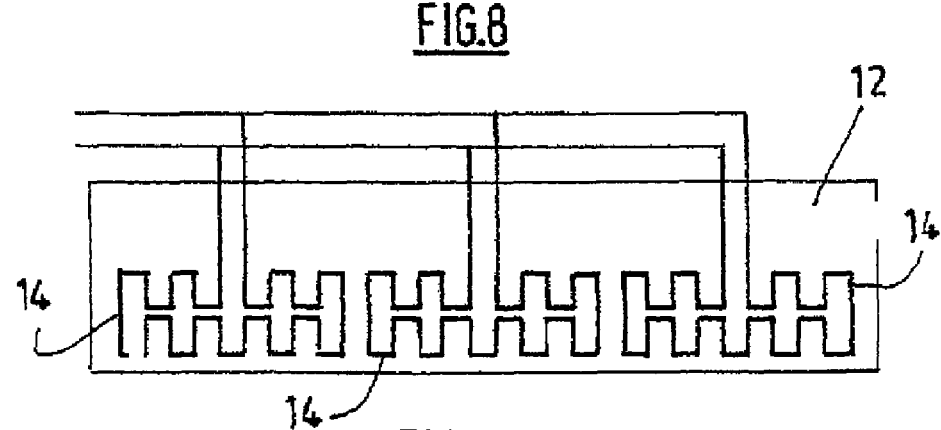
Figure 10:
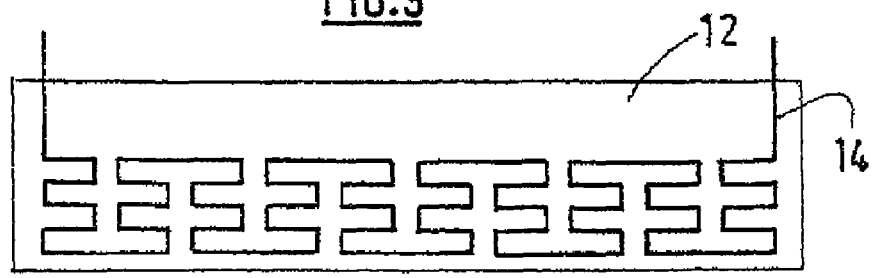

The coil shape of the electric heating element 14 makes it possible to increase the connection between the various layers. This connection may be further enhanced by making, in the electric heating element 14, perforations 20, or even slots as shown in FIG. 6, allowing the connection material to penetrate the perforations so as to ensure a greater interfacing between the various layers. It should be noted that, if the electric heating element 14 is provided with its layer 17 of resin protection, this is the assembly that must have the perforations 20.

The same principle of perforations 20 designed to enhance the cohesion of the layers with one another may apply to the reflective strip.

FIG. 4 illustrates the succession of the various layers forming the wall of the structure.

On the inner acoustic attenuation structure 30, the wall 10 is perforated over its whole thickness. FIG. 5 shows a detail of an electric heating element 14 situated in this zone.

It should be noted that the thickness of the perforated wall 10 at the acoustic attenuation structure 30 is important to the acoustic performance and should not usually exceed a certain thickness. The presence of the heating element 14 slightly increases this thickness. However, the acoustic attenuation structure 30 being situated in the direction of the air intake, the wall 10 is, at this location, less sensitive to impacts. It is therefore possible to reduce the thickness of the outer layer 12 in this zone to compensate for the increase due to the presence of the heating element 14.

As previously indicated, the electric heating element 14 is supplied by a supply outlet connected via a cable 15 to an electric source. This supply outlet traverses the inner skin 13 of the structure 7 close to the centre of the latter in order then to be connected to the cable 15 designed to be connected to the electric source of the downstream structure 4b of the air intake 4. Care must be taken to protect this supply outlet during the manufacture of the wall 10 and notably during the polymerization of the inner skin 13 and of the outer skin 12 and of the resins in the case of organic skins made of composite material.

FIGS. 7 to 10 show various configurations for the electric heating element 14. Notably it is possible to note that FIG. 9 comprises several electric heating elements 14 mounted in parallel. Therefore, in the event of a failure of one electric heating element 14, the other electric heating elements 14 may continue to fulfill their de-icing function.

It will also be possible to have several layers of electric heating elements 14 arranged in configurations that may be different.

Although the invention has been described with reference to particular exemplary embodiments, it is quite clear that it is in no way limited thereto and that it includes all the technical equivalents of the means described and their combinations if the latter enter the scope of the invention.

The invention claimed is:

1. A structure for a lip of an air intake of a pod of a turbojet comprising an outer skin oriented toward an outside of the lip, an inner skin oriented toward an inside of the lip, at least one electric heating element situated between the inner skin and the outer skin and capable of being connected to electric supply means, an acoustic attenuation structure fitted to the inner skin, the inner skin situated between the acoustic attenuation structure and the at least one electric heating element, the at least one electric heating element extending at least partly across an acoustic attenuation zone, and perforations passing in-line through the outer skin, inner skin, and the at least one electric heating element and acoustically associated with the acoustic attenuation structure.

2. The structure as claimed in claim 1, further comprising a layer of protection encompassing the electric heating element.

3. The structure as claimed in claim 2, wherein the layer of protection is a layer of a resin.

4. The structure as claimed in claim 2, wherein the layer of protection is a ply of glass.

5. The structure as claimed in claim 1, wherein the outer skin has a thickness of less than 1 mm.

6. The structure as claimed in claim 1, wherein the electric heating element is in the form of a metal band forming a heating resistance.

7. The structure as claimed in claim 1, wherein the electric heating element is in the form of a cloth, particularly organic or metallic, forming a heating resistance.

8. The structure as claimed in claim 6, wherein the electric heating element is in the form of a coil.

9. A lip of an air intake for a pod of a turbojet comprising a plurality of structures, each of said structures being oriented toward an outside of the lip and comprising an outer skin oriented toward an outside of the lip, an inner skin oriented toward an inside of the lip, at least one electric heating element situated between the inner skin and the outer skin and capable of being connected to electric supply means, an acoustic attenuation structure fitted to the inner skin, the inner skin situated between the acoustic attenuation structure and the at least one electric heating element, the at least one electric heating element extending at least partly across an acoustic attenuation zone, and perforations passing in-line through the outer skin, inner skin, and the at least one electric heating element and acoustically associated with the acoustic attenuation structure.

10. A pod of a turbojet comprising an air intake wherein the air intake is fitted with a lip, the lip comprising one or more structures, each of said structures being oriented toward an outside of the lip and comprising an outer skin oriented toward an outside of the lip, an inner skin oriented toward an inside of the lip, at least one electric heating element situated between the inner skin and the outer skin and capable of being connected to electric supply means, an acoustic attenuation structure fitted to the inner skin, the inner skin situated between the acoustic attenuation structure and the at least one electric heating element, the at least one electric heating element extending at least partly across an acoustic attenuation zone, and perforations passing in-line through the outer skin, inner skin, and the at least one electric heating element and acoustically associated with the acoustic attenuation structure.

* * * * *